(12) United States Patent
Tsukada et al.

(10) Patent No.: US 10,266,628 B2
(45) Date of Patent: Apr. 23, 2019

(54) NITRILE COPOLYMER RUBBER COMPOSITION

(71) Applicant: ZEON CORPORATION, Tokyo (JP)

(72) Inventors: Akira Tsukada, Tokyo (JP); Tadashi Nakamura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 231 days.

(21) Appl. No.: 15/127,955

(22) PCT Filed: Mar. 24, 2015

(86) PCT No.: PCT/JP2015/058899
§ 371 (c)(1),
(2) Date: Sep. 21, 2016

(87) PCT Pub. No.: WO2015/146973
PCT Pub. Date: Oct. 1, 2015

(65) Prior Publication Data
US 2017/0101498 A1  Apr. 13, 2017

(30) Foreign Application Priority Data

Mar. 26, 2014 (JP) .................. 2014-063654

(51) Int. Cl.
| | | |
|---|---|---|
| C08F 220/46 | (2006.01) |
| C08K 3/013 | (2018.01) |
| B32B 25/14 | (2006.01) |
| C08L 9/02 | (2006.01) |
| C08L 27/06 | (2006.01) |
| C08L 33/04 | (2006.01) |
| C08L 35/04 | (2006.01) |
| F16L 11/04 | (2006.01) |
| C08L 33/18 | (2006.01) |
| C08K 3/00 | (2018.01) |
| C08C 19/02 | (2006.01) |
| C08F 220/48 | (2006.01) |
| C08K 3/04 | (2006.01) |
| C08K 3/22 | (2006.01) |
| C08K 3/34 | (2006.01) |

(52) U.S. Cl.
CPC ............ C08F 220/46 (2013.01); B32B 25/14 (2013.01); C08C 19/02 (2013.01); C08F 220/48 (2013.01); C08K 3/0033 (2013.01); C08K 3/013 (2018.01); C08K 3/04 (2013.01); C08K 3/22 (2013.01); C08K 3/346 (2013.01); C08L 9/02 (2013.01); C08L 27/06 (2013.01); C08L 33/04 (2013.01); C08L 33/18 (2013.01); C08L 35/04 (2013.01); F16L 11/04 (2013.01); B32B 2305/30 (2013.01); B32B 2305/72 (2013.01); B32B 2307/7265 (2013.01); B32B 2439/00 (2013.01); B32B 2581/00 (2013.01); B32B 2597/00 (2013.01); C08F 2500/17 (2013.01); C08F 2800/20 (2013.01); C08F 2810/20 (2013.01); C08K 2003/2296 (2013.01); C08K 2201/016 (2013.01)

(58) Field of Classification Search
CPC ...... C08F 220/46; C08F 220/48; C08K 3/013; B32B 25/14; C08L 9/02
See application file for complete search history.

(56) References Cited

U.S. PATENT DOCUMENTS

| | | | |
|---|---|---|---|
| 4,350,796 A | 9/1982 | Oyama et al. | |
| 8,742,006 B2 * | 6/2014 | Nagamori | C08K 3/36 524/556 |
| 2002/0117815 A1 * | 8/2002 | Suddaby | C09K 3/10 277/650 |
| 2005/0131156 A1 | 6/2005 | Sawada et al. | |
| 2009/0124741 A1 * | 5/2009 | Nagamori | C08F 236/12 524/394 |
| 2010/0330319 A1 * | 12/2010 | Tsukada | B32B 1/08 428/36.91 |
| 2013/0280459 A1 | 10/2013 | Nakashima et al. | |
| 2014/0100315 A1 | 4/2014 | Tsukada et al. | |
| 2014/0323658 A1 | 10/2014 | Sakamoto et al. | |
| 2015/0322254 A1 * | 11/2015 | Tsukada | C08L 1/02 524/35 |

FOREIGN PATENT DOCUMENTS

| | | | |
|---|---|---|---|
| EP | 1 152 029 A1 | 11/2001 |
| EP | 1 535 960 A1 | 6/2005 |
| EP | 2 343 338 A1 | 7/2011 |
| EP | 2 548 919 A1 | 1/2013 |

(Continued)

OTHER PUBLICATIONS

Jun. 30, 2015 International Preliminary Report on Patentability issued in International Patent Application No. PCT/JP2015/058899.
Jun. 30, 2015 International Search Report issued in International Patent Application No. PCT/JP2015/058899.
Oct. 25, 2017 Search Report issued in European Patent Application No. 15768962.1.

Primary Examiner — Nicholas E Hill
(74) Attorney, Agent, or Firm — Oliff PLC

(57) ABSTRACT

A nitrile copolymer rubber composition including a nitrile copolymer rubber (A) containing 35 to 80 wt % of α,β-ethylenically unsaturated nitrile monomer units (a1), 19.5 to 64.5 wt % of conjugated diene monomer units (a2), and 0.5 to 20 wt % of α,β-ethylenically unsaturated carboxylic acid monomer units (a3) and an inorganic filler (B) with an aspect ratio of 30 to 2,000, wherein a content of the inorganic filler (B) with respect to 100 parts by weight of the nitrile copolymer rubber (A) is 1 to 200 parts by weight is provided.

15 Claims, No Drawings

(56) References Cited

FOREIGN PATENT DOCUMENTS

| | | | |
|---|---|---|---|
| JP | 2007-269863 | A | 10/2007 |
| JP | 2008-222891 | A | 9/2008 |
| JP | 2009-221371 | A | 10/2009 |
| JP | 2009-235304 | A | 10/2009 |
| JP | 2010-150375 | A | 7/2010 |
| WO | 2010/038720 | A1 | 4/2010 |
| WO | 2013/073660 | A1 | 5/2013 |

* cited by examiner

NITRILE COPOLYMER RUBBER COMPOSITION

TECHNICAL FIELD

The present invention relates to a nitrile copolymer rubber composition giving a cross-linked rubber good in original state physical properties and excellent in gasoline permeation resistance and cold resistance.

BACKGROUND ART

In the past, rubber which contains $\alpha,\beta$-ethylenically unsaturated nitrile monomer units and conjugated diene monomer units or olefin monomer units (nitrile copolymer rubber) has been known as rubber which is excellent in oil resistance. Its cross-linked product is mainly used as material for rubber products around oils in automotive applications such as hoses for fuel use, gaskets, packings, and oil seals.

On the other hand, in recent years, due to rising global activities to protect the environment, efforts are being made to reduce the amount of evaporation of gasoline and other fuel into the atmosphere. In Japan as well, in applications for fuel hoses, seals, and packings, much better gasoline permeation resistance is being sought in addition to mechanical properties such as tensile strength.

In this situation, Patent Document 1 discloses, as a nitrile copolymer rubber composition which gives a cross-linked product which is improved in gasoline permeation resistance, a nitrile copolymer rubber composition which contains a nitrile copolymer rubber which has 10 to 65 wt % of $\alpha,\beta$-ethylenically unsaturated nitrile monomer units, 15 to 89.9 wt % of conjugated diene units, and 0.1 to 20 wt % of cationic monomer units and/or monomer units able to form cations and a flat-shaped inorganic filler with an aspect ratio of 30 to 2,000.

However, in the art of the above Patent Document 1, while the gasoline permeation resistance and cold resistance are improved to a certain degree, due to the higher degree of properties demanded in recent years, further improvement of the gasoline permeation resistance and cold resistance have been sought.

RELATED ART

Patent Documents

Patent Document 1: Japanese Patent Publication No. 2009-235304A

SUMMARY OF THE INVENTION

Problem to be Solved by the Invention

The present invention was made in consideration of this actual situation and has as its object the provision of a nitrile copolymer rubber composition giving a cross-linked rubber good in original state physical properties s and excellent in gasoline permeation resistance and cold resistance.

Means for Solving the Problem

The inventors engaged in in-depth research to achieve the above object and as a result discovered that by using a nitrile copolymer rubber composition comprising a nitrile copolymer rubber which has $\alpha,\beta$-ethylenically unsaturated nitrile monomer units, conjugated diene monomer units, and $\alpha,\beta$-ethylenically unsaturated carboxylic acid monomer units in predetermined ratios and an inorganic filler with an aspect ratio of 30 to 2,000, it is possible to achieve the above object and thereby completed the present invention.

That is, according to the present invention, there is provided a nitrile copolymer rubber composition comprising a nitrile copolymer rubber (A) containing 35 to 80 wt % of $\alpha,\beta$-ethylenically unsaturated nitrile monomer units (a1), 19.5 to 64.5 wt % of conjugated diene monomer units (a2), and 0.5 to 20 wt % of $\alpha,\beta$-ethylenically unsaturated carboxylic acid monomer units (a3) and an inorganic filler (B) with an aspect ratio of 30 to 2,000, wherein a content of the inorganic filler (B) with respect to 100 parts by weight of the nitrile copolymer rubber (A) is 1 to 200 parts by weight.

Preferably, the $\alpha,\beta$-ethylenically unsaturated carboxylic acid monomer units (a3) are $\alpha,\beta$-ethylenically unsaturated monocarboxylic acid monomer units having 3 to 8 carbon atoms and/or butenedioic acid mono chain alkyl ester monomer units having 5 to 15 carbon atoms.

Preferably, the nitrile copolymer rubber (A) is a hydrogenated nitrile copolymer rubber where at least part of the carbon-carbon unsaturated bond parts is hydrogenated.

Preferably, the nitrile copolymer rubber composition of the present invention further comprises 10 to 150 parts by weight of a vinyl chloride resin and/or acrylic resin with respect to 100 parts by weight of the nitrile copolymer rubber (A).

According to the present invention, there is provided a cross-linkable nitrile copolymer rubber composition comprising the above nitrile copolymer rubber composition and a cross-linking agent.

Further, according to the present invention, there is provided cross-linked rubber obtained by cross-linking the above cross-linkable nitrile copolymer rubber composition according. The cross-linked rubber of the present invention is preferably a hose, seal, packing, or gasket.

Furthermore, according to the present invention, there is provided a laminate comprised of two or more layers, at least one layer of which is comprised of the above cross-linked rubber.

Effects of the Invention

According to the present invention, a nitrile copolymer rubber composition giving a cross-linked rubber good in original state physical properties (mechanical properties) and excellent in gasoline permeation resistance and cold resistance and a cross-linked rubber which is obtained by cross-linking the composition and has the above properties are provided.

DESCRIPTION OF EMBODIMENTS

Nitrile Copolymer Rubber Composition

The nitrile copolymer rubber composition of the present invention is a composition of nitrile copolymer rubber comprising a nitrile copolymer rubber (A) containing 35 to 80 wt % of $\alpha,\beta$-ethylenically unsaturated nitrile monomer units (a1), 19.5 to 64.5 wt % of conjugated diene monomer units (a2), and 0.5 to 20 wt % of $\alpha,\beta$-ethylenically unsaturated carboxylic acid monomer units (a3) and an inorganic filler (B) with an aspect ratio of 30 to 2,000, wherein a content of the inorganic filler (B) with respect to 100 parts by weight of the nitrile copolymer rubber (A) is 1 to 200 parts by weight.

Nitrile Copolymer Rubber (A)

First, the nitrile copolymer rubber (A) used in the present invention will be explained. The nitrile copolymer rubber (A) used in the present invention is a rubber containing 35 to 80 wt % of α,β-ethylenically unsaturated nitrile monomer units (a1), 19.5 to 64.5 wt % of conjugated diene monomer units (a2), and 0.5 to 20 wt % of α,β-ethylenically unsaturated carboxylic acid monomer units (a3).

An α,β-ethylenically unsaturated nitrile monomer forming the α,β-ethylenically unsaturated nitrile monomer units (a1) is not particularly limited so long as an α,β-ethylenically unsaturated compound having a nitrile group, but, for example, acrylonitrile; α-halogenoacrylonitrile such as α-chloroacrylonitrile and α-bromoacrylonitrile; α-alkyl acrylonitriles such as methacrylonitrile; etc. may be mentioned. Among these as well, acrylonitrile and methacrylonitrile are preferable. These may be used as single types alone or as a plurality of types together.

The ratio of content of the α,β-ethylenically unsaturated nitrile monomer units (a1) is 35 to 80 wt % with respect to the total monomer units, preferably 40 to 70 wt %, more preferably 40 to 60 wt %. If the ratio of content of the α,β-ethylenically unsaturated nitrile monomer units (a1) is too low, the obtained cross-linked rubber will deteriorate in oil resistance and gasoline permeation resistance. On the other hand, if the ratio of content is too high, the obtained cross-linked rubber will become inferior in cold resistance and higher in embrittlement temperature.

As a conjugated diene monomer forming the conjugated diene monomer units, a conjugated diene monomer having 4 to 6 carbon atoms is preferable. For example, 1,3-butadiene, isoprene, 2,3-dimethyl-1,3-butadiene, 1,3-pentadiene, etc. may be mentioned. Among these as well, 1,3-butadiene is preferable. These may be used as single types alone or as a plurality of types together.

The ratio of content of the conjugated diene monomer units (a2) is 19.5 to 64.5 wt % with respect to the total monomer units, preferably 29.5 to 59.5 wt %, more preferably 39 to 59 wt % ℃. If the ratio of content of the conjugated diene monomer units (a2) is too low, the obtained cross-linked rubber will end up falling in rubber elasticity. On the other hand, if the ratio of content is too high, the obtained cross-linked rubber may be impaired in chemical resistance stability.

An α,β-ethylenically unsaturated carboxylic acid monomer forming the α,β-ethylenically unsaturated carboxylic acid monomer units (a3) is not particularly limited so long as an α,β-ethylenically unsaturated compound having at least one nonesterified unsubstituted (free) carboxyl group, but, for example, an α,β-ethylenically unsaturated monocarboxylic acid having 3 to 12 carbon atoms, α,β-ethylenically unsaturated dicarboxylic acid having 4 to 12 carbon atoms, and α,β-ethylenically unsaturated dicarboxylic acid monoester having 5 to 20 carbon atoms may be mentioned.

As specific examples of the α,β-ethylenically unsaturated monocarboxylic acid having 3 to 12 carbon atoms, acrylic acid, methacrylic acid, α-ethylacrylic acid, crotonic acid, cinnamic acid, etc. may be mentioned.

As specific examples of the α,β-ethylenically unsaturated dicarboxylic acid having 4 to 12 carbon atoms, a butenedioic acid such as fumaric acid and maleic acid; itaconic acid; citraconic acid; chloromaleic acid; etc. may be mentioned.

As specific examples of the α,β-ethylenically unsaturated dicarboxylic acid monoester having 5 to 20 carbon atoms, a butendioic acid mono chain alkyl ester such as monomethyl fumarate, monoethyl fumarate, mono-n-butyl fumarate, monomethyl maleate, monoethyl maleate, and monobutyl maleate; butenedioic acid monoester having an alicyclic structure such as monocyclopentyl fumarate, monocyclohexyl fumarate, monocyclohexenyl fumarate, monocyclopentyl maleate, monocyclohexyl maleate, and monocyclohexenyl maleate; itaconic acid monoester such as monomethyl itaconate, monoethyl itaconate, mono-n-butyl itaconate, and monocyclohexyl itaconate; etc. may be mentioned.

Among these as well, since the effect of the present invention becomes much more remarkable, an α,β-ethylenically unsaturated monocarboxylic acid having 3 to 12 carbon atoms and α,β-ethylenically unsaturated dicarboxylic acid monoester having 5 to 20 carbon atoms are preferable, an α,β-ethylenically unsaturated monocarboxylic acid having 3 to 8 carbon atoms and butendioic acid mono chain alkyl ester having 5 to 15 carbon atoms are more preferable, acrylic acid, methacrylic acid, monobutyl fumarate, and monobutyl maleate are still more preferable, and methacrylic acid and monobutyl maleate are particularly preferable. These α,β-ethylenically unsaturated carboxylic acid monomers may be used as single types alone or as a plurality of types combined. Note that, among the above monomers, dicarboxylic acids include ones present as anhydrides.

The ratio of content of the α,β-ethylenically unsaturated carboxylic acid monomer units (a3) is 0.5 to 20 wt % with respect to the total monomer units, preferably 0.5 to 10 wt %, more preferably 1 to 5 wt %. If the ratio of content of the α,β-ethylenically unsaturated carboxylic acid monomer units (a3) is too low, the obtained cross-linked rubber becomes inferior in cold resistance and becomes higher in embrittlement temperature. On the other hand, if the ratio of content is too high, the obtained cross-linked rubber may fall in fatigue resistance.

Furthermore, the nitrile copolymer rubber (A) used in the present invention may contain, in addition to the above α,β-ethylenically unsaturated nitrile monomer units (a1), conjugated diene monomer units (a2), and α,β-ethylenically unsaturated carboxylic acid monomer units (a3), units of other monomers able to copolymerize with the monomers forming these monomer units. The ratio of content of such other monomer units is preferably 30 wt % or less with respect to the total monomer units, more preferably 20 wt % or less, still more preferably 10 wt % or less.

As such other copolymerizable monomers, for example, a cationic monomer, monomer able to form cation, etc. may be mentioned. The cationic monomer and monomer able to form cation are a monomer forming monomer units which are charged to the plus side when the obtained polymer comes into contact with water or an aqueous solution. For example, as a cationic monomer, a monomer containing a quaternary ammonium salt group may be mentioned. Further, as a monomer able to form cation, a monomer which has a precursor part (substituent) such as a tertiary amine group which is cationated to an ammonium salt (for example amine hydrochloride or amine sulfate) etc. when contacting an acid aqueous solution such as a hydrochloric acid or sulfuric may be mentioned.

As specific examples of cationic monomer, (meth)acrylic acid ester monomer containing quaternary ammonium salt group such as (meth)acryloyloxytrimethylammonium chloride (meaning acryloyloxytrimethylammonium chloride and/or methacryloyloxytrimethylammonium chloride, same below), (meth)acryloyloxyhydroxypropyltrimethylammonium chloride, (meth) acryloyloxytriethylammonium chloride, (meth)acryloyloxydimethylbenzylammonium chloride, and (meth) acryloyloxytrimethylammonium methyl sulfate; (meth)acrylamide monomer containing quaternary ammonium salt group such as (meth) acrylamide propyltrimethylammonium chloride and (meth) acrylamide propyldimethylbenzylammonium chloride; etc. may be mentioned. These may be used as single types alone or as a plurality of types together.

As specific examples of the monomer able to form cation, vinyl group-containing cyclic amine monomer such as 2-vinylpyridine and 4-vinylpyridine; tertiary amino group-containing (meth)acrylic acid ester monomer such as dimethylaminoethyl (meth)acrylate; tertiary amino group-containing (meth)acrylamide monomer such as dimethylaminoethyl(meth)acrylamide and N,N-dimethylaminopropylacrylamide; N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinyl benzyloxy)aniline, N-phenyl-4-(4-vinyl benzyloxy)aniline, etc. may be mentioned. These may be used as single types alone or as a plurality of types together.

Further, as the copolymerizable other monomer, in addition to the above-mentioned cationic monomer and monomer able to form cation, for example, fluorine-containing vinyl compound such as fluoroethylvinyl ether, fluoropropylvinyl ether, o-(trifluoro)methylstyrene, vinyl pentafluorobenzoate, difluoroethylene, and tetrafluoroethylene; nonconjugated diene compound such as 1,4-pentadiene, 1,4-hexadiene, vinylnorbornene, and dicyclopentadiene; ethylene; α-olefin compound such as propylene, 1-butene, 4-methyl-1-pentene, 1-hexene, and 1-octene; α,β-ethylenically unsaturated monocarboxylic acid alkyl ester such as methyl (meth)acrylate, ethyl (meth)acrylate, butyl (meth)acrylate, and 2-ethylhexyl (meth)acrylate; diester of α,β-ethylenically unsaturated dicarboxylic acid such as diethyl maleate, dibutyl maleate, diethyl fumarate, dibutyl fumarate, dicyclohexyl fumarate, diethyl itaconate, and dibutyl itaconate; alkoxyalkyl ester of α,β-ethylenically unsaturated monocarboxylic acid such as methoxyethyl (meth)acrylate, methoxypropyl (meth)acrylate, and butoxyethyl (meth)acrylate; hydroxyalkyl ester of α,β-ethylenically unsaturated monocarboxylic acid such as 2-hydroxyethyl (meth)acrylate and 3-hydroxypropyl (meth)acrylate; divinyl compound such as divinylbenzene; di(meth)acrylic acid ester such as ethylene di(meth)acrylate, diethyleneglycol di(meth)acrylate, and ethyleneglycol di(meth)acrylate; tri(meth)acrylic acid ester such as trimethylolpropane tri(meth)acrylate; and other polyfunctional ethylenically unsaturated monomer and also self cross-linkable compound such as N-methylol (meth)acrylamide and N,N'-dimethylol(meth)acrylamide; etc. may be used.

The Mooney viscosity ($ML_{1+4}$, 100° C.) of the nitrile copolymer rubber (A) used in the present invention (below, sometimes called the "polymer Mooney viscosity") is preferably 3 to 250, more preferably 15 to 180, still more preferably 20 to 170. If the polymer Mooney viscosity of the nitrile copolymer rubber is too low, the obtained cross-linked rubber is liable to fall in strength characteristics. On the other hand, if too high, the processability may deteriorate.

The nitrile copolymer rubber (A) used in the present invention can be produced by copolymerizing the monomers which form the above nitrile copolymer rubber. The method of copolymerizing the monomers is not particularly limited, but for example the emulsion polymerization method of using an emulsifier such as sodium dodecylbenzene sulfonate to obtain a latex of a copolymer having an about 50 to 1,000 nm average particle size, the suspension polymerization method of using a dispersant such as polyvinyl alcohol to obtain an aqueous dispersion of a copolymer having an about 0.2 to 200 µm average particle size (including also microsuspension polymerization method), etc. may be suitably used. Among these as well, due to the ease of control of the polymerization reaction, the emulsion polymerization method is more preferable.

The emulsion polymerization method is preferably performed by the following procedure.

Note that, below, suitably, the α,β-ethylenically unsaturated nitrile monomer will be referred to as the "monomer (m1)", the conjugated diene monomer as the "monomer (m2)", and the α,β-ethylenically unsaturated carboxylic acid monomer as the "monomer (m3)".

That is, the method of polymerizing a monomer mixture comprised of the monomer (m1) in 35 to 80 wt %, preferably 40 to 70 wt %, more preferably 40 to 60 wt %, the monomer (m2) in 19.5 to 64.5 wt %, preferably 29.5 to 59.5 wt %, more preferably 39 to 59 wt %, and the monomer (m3) in 0.5 to 20 wt %, preferably 0.5 to 10 wt %, more preferably 1 to 5 wt % (where the total of the monomer (m1), monomer (m2), and monomer (m3) is 100 wt %) by emulsion polymerization and stopping the polymerization reaction when the polymerization conversion rate is preferably 50 to 95 wt %, then removing the unreacted monomers as desired is preferable.

If the amount of the monomer (m1) used for the emulsion polymerization method is too small, the obtained cross-linked rubber deteriorates in oil resistance and deteriorates in gasoline permeation resistance. On the other hand, if the amount of use of the monomer (m1) is too large, the cold resistance tends to deteriorate. If the amount of use of the monomer (m2) is too small, the obtained cross-linked rubber deteriorates in cold resistance, while if the amount of use of the monomer (m2) is too large, the obtained cross-linked rubber tends to deteriorate in gasoline permeation resistance. Further, if the amount of use of the monomer (m3) is too small, the obtained cross-linked rubber deteriorates in cold resistance, while if the amount of use of the monomer (m3) is too large, the obtained cross-linked rubber may fall in fatigue resistance.

Note that, if the polymerization conversion rate for stopping the polymerization reaction is too low, recovery of the unreacted monomers will become extremely difficult. On the other hand, if too high, the obtained cross-linked rubber will deteriorate in original state physical properties.

At the time of emulsion polymerization, it is possible to suitably use emulsifiers, polymerization initiators, polymerization secondary materials, etc. which are conventionally known in the field of emulsion polymerization. The polymerization temperature and polymerization time also may be suitably adjusted.

Further, it is possible to use the entire amounts of the monomers (m1) to (m3) which are used for the emulsion polymerization so as to start the polymerization reaction, but from the viewpoint of controlling the distribution of composition of the monomer units of the copolymer which is produced and obtaining cross-linked rubber which is richer in rubber elasticity, it is preferable to use parts of the entire amounts of the monomers (m1) to (m3) which are used for the emulsion polymerization to start the polymerization reaction, then add the remains of the monomers (m1) to (m3) which are used for the emulsion polymerization at a stage in the middle of the reaction to the reaction vessel to continue the polymerization reaction. This is because if making the entire amounts of the monomers (m1) to (m3) which are used for the emulsion polymerization react from the start of the polymerization reaction, the distribution of composition of the copolymer ends up becoming broader.

In this case, it is preferable to charge, into the reaction vessel, a monomer mixture comprised of preferably 10 to 100 wt % of the monomer (m1) used for the polymerization, more preferably 20 to 100 wt %, particularly preferably 30 to 100 wt %, preferably 5 to 90 wt % of the monomer (m2) used for the polymerization, more preferably 10 to 80 wt %, particularly preferably 15 to 70 wt %, and preferably 10 to 100 wt % of the monomer (m3) used for the polymerization, more preferably 30 to 100 wt %, particularly preferably 70 to 100 wt %, to start the polymerization reaction, then, when the polymerization conversion rate with respect to the monomer mixture charged into the reactor is preferably 5 to 80 wt % in range, to add the remaining monomers to the reactor to continue the polymerization reaction.

The method of adding the remaining monomers is not particularly limited. They may be added all together, may be added divided into batches, or may be continuously added. In the present invention, from the viewpoint of the greater ease of control of the distribution of composition of the obtained copolymer, it is preferable to add the remaining monomers divided into batches. Addition divided into one to six batches is particularly preferable. When adding the remaining monomers divided into batches, the amounts of the monomers to be added divided into batches and the timings of addition divided into batches may be adjusted so as to match with the progress of the polymerization reaction and so that the desired nitrile copolymer rubber is obtained.

Further, after that, if desired, it is possible to use a known method such as heat distillation, vacuum distillation, or steam distillation to remove the unreacted monomers and thereby obtain a latex of nitrile copolymer rubber (A).

Next, the obtained latex of the nitrile copolymer rubber (A) is coagulated and if necessary rinsed and dried to obtain the nitrile copolymer rubber (A). The coagulation of the latex of the nitrile copolymer rubber (A) is not particularly limited, but coagulation by freezing, coagulation by drying, coagulation by a water-soluble organic liquid, coagulation by salting out, or other known method can be used. As the coagulant, calcium chloride, sodium chloride, calcium hydroxide, aluminum sulfate, aluminum hydroxide, etc. may be mentioned. Further, the amount of use of the coagulant is preferably 0.5 to 30 wt % with respect to the nitrile copolymer rubber (A), particularly preferably 0.5 to 20 wt %.

Note that, the nitrile copolymer rubber (A) used in the present invention may be hydrogenated nitrile copolymer rubber comprised of a copolymer which is obtained by copolymerization in the above way wherein at least part of the carbon-carbon unsaturated bond parts in the conjugated diene monomer unit part is hydrogenated (hydrogen addition reaction). The method of hydrogenation is not particularly limited. Any known method may be employed. When making the nitrile copolymer rubber (A) a hydrogenated nitrile copolymer rubber, its iodine value is preferably 0 to 70 in range, more preferably 4 to 60 in range. By hydrogenating the nitrile copolymer rubber (A) and making it a hydrogenated nitrile copolymer rubber, it is possible to improve the heat resistance, weather resistance, ozone resistance, etc.

Inorganic Filler (B)

The inorganic filler (B) used in the present invention is a flat-shaped inorganic filler with an aspect ratio of 30 to 2,000, preferably 35 to 1,800, more preferably 40 to 1,600, particularly preferably 50 to 1000. By using such a flat-shaped inorganic filler, it is possible to give the obtained cross-linked rubber the effect of blocking the permeation of gasoline. Further, among flat-shaped inorganic fillers as well, by using an inorganic filler with an aspect ratio in the above range and combining this with the above nitrile copolymer rubber (A), the obtained cross-linked rubber can be made good in original state physical properties while being made excellent in gasoline permeation resistance and cold resistance. If the aspect ratio is too small, the obtained cross-linked rubber ends up deteriorating in gasoline permeation resistance. On the other hand, if too large, dispersion into the nitrile copolymer rubber (A) becomes difficult and the mechanical strength ends up falling.

Note that, in the present invention, the aspect ratio of the inorganic filler (B) can be calculated by finding the ratio between the average diameter in the plane and average thickness of the primary particles of the inorganic filler (B). Here, the planar average diameter and average thickness are the values of the number average values obtained by randomly selecting 100 particles of the inorganic filler (B), then measuring the diameters and thicknesses in the planar direction of the selected 100 particles of the inorganic filler (B) by an atomic force microscope and calculating the arithmetic averages of the obtained measurement results.

The inorganic filler with an aspect ratio of 30 to 2,000 is not particularly limited. It may be one derived from a natural material, a natural material which is refined or otherwise treated, or may be a synthetic material. As specific examples, kaolinites such as kaolinite or halloysite; smectites such as montmorillonite, beidellite, nontronite, saponite, hectorite, stevensite, and mica; vermiculites; chlorites; talc; amorphous plate-shaped particles such as E glass or C glass, that is, glass flakes etc. may be mentioned. Among these as well, smectites are preferable, while montmorillonite, mica, and saponite are particularly preferred. These may be used as single types alone or as a plurality of types combined. In particular, in the present invention, it is preferable to treat the montmorillonite, mica, and saponite by an aqueous dispersion, separate the layers forming the multilayer structured compounds of montmorillonite, mica, and saponite, and use what is obtained. By performing such aqueous dispersion treatment in this way, it is possible to obtain a composition with a good dispersion ability. Here, among the above, montmorillonite used as the inorganic filler (B) is contained as the main ingredient in bentonite. Therefore, as the montmorillonite, it is possible to use one obtained by refining bentonite.

Further, the average particle size (average primary particle size) of the inorganic filler (B) is preferably 0.05 to 100 µm, more preferably 0.1 to 80 µm, particularly preferably 0.1 to 50 µm. In the present invention, the average particle size of the inorganic filler (B) is defined by the 50% volume cumulative size found by using the X-ray transmission method to measure the particle size distribution. If the particle size of the inorganic filler (B) is too small, the obtained cross-linked rubber is liable to fall in elongation, while conversely if too large, preparation of a stable rubber composition may not be possible.

The content of the inorganic filler (B) is 1 to 200 parts by weight with respect to 100 parts by weight of the nitrile copolymer rubber (A), preferably 2 to 150 parts by weight, still more preferably 3 to 120 parts by weight, particularly preferably 3 to 60 parts by weight. If the amount of use of the inorganic filler (B) is too small, the obtained cross-linked rubber is liable to deteriorate in gasoline permeation resistance or become insufficient in sour gasoline resistance. On the other hand, if the amount of use is too great, the elongation is liable to fall.

Vinyl Chloride Resin and/or Acrylic Resin

Further, the nitrile copolymer rubber composition of the present invention may further contain a vinyl chloride resin and/or acrylic resin in addition to the above-mentioned nitrile copolymer rubber (A) and inorganic filler (B). By making the nitrile copolymer rubber composition of the present invention further contain a vinyl chloride resin and/or acrylic resin, preferably a vinyl chloride resin, the obtained cross-linked rubber can be improved in ozone resistance.

The vinyl chloride resin has a main constituent monomer constituted by vinyl chloride. The content of the units of the main constituent monomer is preferably 50 to 100 wt %, more preferably 60 to 100 wt %, still more preferably 70 to 100 wt %. The vinyl chloride resin has an average polymerization degree based on the solution viscosity method prescribed in JIS K6721 of preferably 400 to 3,000, more preferably 600 to 2,000, and has a glass transition temperature (Tg) of preferably 50 to 180° C.

The vinyl chloride resin can be produced by the conventionally known emulsion polymerization or suspension polymerization.

For example, when producing it by emulsion polymerization, a pressure resistant reaction vessel is charged with water, sodium lauryl sulfate or other emulsifier, and potassium persulfate or other polymerization initiator, is repeatedly reduced in pressure and degassed, then is charged with the vinyl chloride monomer (with another monomer able to copolymerize with it able to be added as required), the mixture is warmed while stirring it to perform emulsion polymerization, a polymerization terminator is added when the polymerization conversion rate reaches a predetermined value, then the solution is cooled to room temperature and the unreacted monomers is removed to obtain the vinyl chloride resin latex. Next, the obtained vinyl chloride resin latex is coagulated and if necessary rinsed and dried in the same way as the case of the above nitrile copolymer rubber (A) latex to obtain the vinyl chloride resin.

The acrylic resin is a resin where the main constituent monomer is an (meth)acrylic acid alkyl ester. The content of the units of the main constituent monomer is preferably 50 to 100 wt %, more preferably 60 to 100 wt %, furthermore preferably 70 to 100 wt %. Further, an acrylic resin has a number average molecular weight (Mn) by gel permeation chromatography (GPC) converted to standard polystyrene of preferably 10,000 to 7,000,000, more preferably 100,000 to 2,000,000, and a glass transition temperature (Tg) of preferably 60 to 150° C.

The acrylic resin can be produced by the conventionally known emulsion polymerization or suspension polymerization.

For example, when producing it by emulsion polymerization, a reaction vessel is charged with water, sodium octylsulfate or other emulsifier, ammonium persulfate or other polymerization initiator, methyl methacrylate or other monomer (with another monomer able to copolymerize with it able to be added as required), the mixture can be warmed while stirring it to perform emulsion polymerization, a polymerization terminator is added when the polymerization conversion rate reaches a predetermined value, then the solution is cooled to room temperature and the unreacted monomers is removed to obtain the acrylic resin latex. Next, the obtained acrylic resin latex is coagulated and if necessary rinsed and dried in the same way as the case of the above nitrile copolymer rubber (A) latex to obtain the acrylic resin.

In the nitrile copolymer rubber composition of the present invention, the content of the vinyl chloride resin and/or acrylic resin is preferably 10 to 150 parts by weight with respect to 100 parts by weight of the nitrile copolymer rubber (A), more preferably 15 to 130 parts by weight, furthermore preferably 20 to 100 parts by weight. If the content of the vinyl chloride resin and/or acrylic resin is too small, the gasoline permeation resistance and ozone resistance are liable to become inferior, while if the content is too large, the cold resistance is liable to deteriorate.

Other Ingredients

Further, the nitrile copolymer rubber composition of the present invention may contain a plasticizer in addition to the above ingredients.

The plasticizer is not particularly limited, but since the obtained cross-linked rubber becomes excellent in gasoline permeation resistance and cold resistance and since the embrittlement temperature falls (cold resistance is improved), a plasticizer with an SP value (solubility parameter) by the HOY method of 8 to 10.2 $(cal/cm^3)^{1/2}$ is preferable.

As specific examples of such a plasticizer (units of SP value are "$(cal/cm^3)^{1/2}$"), for example, dibutoxyethyl adipate (SP value: 8.8), di(butoxyethoxyethyl)adipate (SP value: 9.2), di(methoxytetraethyleneglycol)adipate, di(methoxypentaethyleneglycol) adipate, (methoxytetraethyleneglycol)(methoxypentaethyleneglycol) adipate, di(methoxytriethoxyethyl)adipate, (methoxytriethoxyethyl) (methoxytetraethoxyethyl)adipate, di(methoxytetraethoxyethyl)adipate, (butoxytriethoxyethyl)(pentoxytetraethoxyethyl)adipate, (pentoxytriethoxyethyl) (pentoxytetraethoxyethyl)adipate, and other ester compounds of adipic acid and ether bond-containing alcohols; dibutoxyethyl azelate, di(butoxyethoxyethyl)azelate, and other ester compounds of azelaic acid and ether bond-containing alcohols; dibutoxyethyl sebacate, di(butoxyethoxyethyl)sebacate, and other ester compounds of sebacic acid and ether bond-containing alcohols; dibutoxyethyl phthalate, di(butoxyethoxyethyl) phthalate, and other ester compounds of phthalic acid and ether bond-containing alcohols; dibutoxyethyl isophthalate, di(butoxyethoxyethyl)isophthalate, and other ester compounds of isophthalic acid and ether bond-containing alcohols; di-(2-ethylhexyl)adipate (SP value: 8.5), diisodecyl adipate (SP value: 8.3), diisononyl adipate, dibutyl adipate (SP value: 8.9), and other adipic acid dialkyl esters; di-(2-ethylhexyl)azelate (SP value: 8.5), diisooctyl azelate, di-n-hexyl azelate, and other azelaic acid dialkyl esters; di-n-butyl sebacate (SP value: 8.7), di-(2-ethylhexyl)sebacate (SP value: 8.4), and other sebacic acid dialkyl esters; dibutyl phthalate (SP value: 9.4), di-(2-ethylhexyl) phthalate (SP value: 9.0), di-n-octyl phthalate, diisobutyl phthalate, diheptyl phthalate (SP value: 9.0), diisodecyl phthalate (SP value: 8.5), diundecyl phthalate (SP value: 8.5), diisononyl phthalate (SP value: 8.9), and other phthalic acid dialkyl esters; dicyclohexyl phthalate and other phthalic acid dicycloalkyl esters; diphenyl phthalate, butylbenzyl phthalate (SP value: 10.2), and other phthalic acid arylesters; di-(2-ethylhexyl) isophthalate, diisooctyl isophthalate, and other isophthalic acid dialkyl esters; di-(2-ethylhexyl) tetrahydrophthalate, di-n-octyl tetrahydrophthalate, diisodecyl tetrahydrophthalate, and other tetrahydrophthalic acid dialkyl esters; tri-(2-ethylhexyl) trimellitate (SP value: 8.9), tri-n-octyl trimellitate (SP value: 8.9), triisodecyl trimellitate (SP value: 8.4), triisooctyl trimellitate, tri-n-hexyl trimellitate, triisononyl trimellitate (SP value: 8.8), triisodecyl trimellitate (SP value: 8.8), and other trimellitic acid derivatives; epoxylated soybean oil (SP value: 9.0), epoxylated linseed oil (SP value: 9.3), and other epoxy-based plasticizers; tricresyl phosphate (SP value: 9.7), and other phosphoric acid ester-based plasticizers; etc. may be mentioned. These may be used as single types alone or as a plurality of types combined.

Among these as well, the obtained cross-linked rubber can be made much better in gasoline permeation resistance and cold resistance, so ester compounds of adipic acid, azelaic acid, sebacic acid, phthalic acid, and other dibasic acids and ether bond-containing alcohols are preferable, ester compounds of adipic acid and ether bond-containing alcohols are more preferable, and di(butoxyethoxyethyl) adipate is particularly preferable.

In the nitrile copolymer rubber composition of the present invention, the content of the plasticizer is preferably 0.1 to 200 parts by weight with respect to 100 parts by weight of the nitrile copolymer rubber (A), more preferably 5 to 150 parts by weight, furthermore preferably 5 to 70 parts by weight. If the amount of the plasticizer used is in the above range, bleeding can be prevented and also the effect of the present invention becomes much more remarkable.

Method of Preparation of Nitrile Copolymer Rubber Composition

The method of preparation of the nitrile copolymer rubber composition of the present invention is not particularly limited, but the following method can be used for preparation. That is, first, the above method is used to prepare a latex of the nitrile copolymer rubber (A), then an aqueous dispersion of the inorganic filler (B) and a latex of the acrylic resin and/or vinyl chloride resin added in accordance with need and an aqueous dispersion of a plasticizer added in accordance with need are added while stirring to the latex of the nitrile copolymer rubber (A) to thereby obtain a latex composition. Further, the obtained latex composition is made to coagulate and if necessary is rinsed and dried to prepare the nitrile copolymer rubber composition of the present invention.

Note that, rather than add the plasticizer as an aqueous dispersion, it is also possible to mix it in using a kneader such as a Bambury mixer after making the latex composition coagulate (if necessary rinsing and drying it).

The method of preparation of the aqueous dispersion of the inorganic filler (B) is not particularly limited, but it is sufficient to strongly stir the aqueous medium while adding the inorganic filler (B). In this case, it is preferable to use an aqueous medium containing a dispersant or a surfactant etc. such as sodium polyacrylate, sodium tripolyphosphate, sodium hexametaphosphate, sodium pyrophosphate, sodium polymaleate, and an Na salt of a β-naphthalene sulfonic acid-formalin condensate in an amount of 0.1 to 10 wt % with respect to the inorganic filler (B). These may be used as single types alone or as a plurality of types together. The solid content concentration of the aqueous dispersion of the inorganic filler (B) is preferably 1 to 50 wt %, more preferably 2 to 40 wt %.

Further, in the present invention, when preparing an aqueous dispersion of the inorganic filler (B), it is also possible to use a wet-type crusher to disperse the inorganic filler (B) in water. By using a wet-type crusher for dispersion, when the inorganic filler (B) secondarily aggregates, it is possible to eliminate the secondary aggregation of the inorganic filler (B). It is possible to make the obtained cross-linked rubber one which is more superior in gasoline permeation resistance. As the wet-type crusher which is used in this case, a Nanomizer (made by Yoshida Kikai Co., Ltd.), Superwing Mill DM-200 (made by Estec Co., Ltd.), Starburst (made by Sugino Machine), Starmill (made by Ashizawa Finetec), etc. may be mentioned, but it is possible to use another wet-type crusher of course so long as a similar effect is obtained.

Further, the method of preparation of the aqueous dispersion of the plasticizer in the case of adding a plasticizer as the aqueous dispersion is not particularly limited, but it is preferable to strongly stir the aqueous dispersion which contains a 0.5 to 10 wt % amount of a surfactant with respect to the plasticizer while adding the plasticizer. As such a surfactant, an anionic surfactant such as potassium rosinate, sodium lauryl sulfate, potassium oleate, and sodium dodecylbenzene sulfonate; a nonionic surfactant such as polyoxyethylene alkyl ether, polyoxyethylene alkyl ester, and polyoxyethylene sorbitan alkyl ester; a cationic surfactant such as didecyldimethylammonium chloride and stearyltrimethylammonium chloride; etc. may be mentioned. Note that, the concentration of the plasticizer in the aqueous dispersion is preferably 5 to 70 wt %.

The coagulation of the latex composition is not particularly limited, but a known method such as freeze coagulation, dry coagulation, coagulation by an water-soluble organic liquid, and salting out coagulation may be applied. Among these as well, adding a latex composition to an aqueous solution containing a coagulating agent to cause salting out is preferable. As the coagulating agent, calcium chloride, sodium chloride, calcium hydroxide, aluminum sulfate, aluminum hydroxide, etc. may be mentioned. Further, the amount of use of the coagulating agent is preferably 0.5 to 150 parts by weight with respect to 100 parts by weight of the nitrile copolymer rubber (A).

In general, the particle size of the crumbs has a large effect on the dehydration at the vibrating screen or squeezer which follows the coagulation and washing steps, the crumb recovery rate, and the dryness in the drying step. For example, if the particle size of the crumbs is too small, with a vibrating screen etc., the crumbs flow out from the mesh of the screen when small or the polymer is insufficiently squeezed at the squeezer and the dehydration rate falls resulting in deterioration of the productivity. For this reason, the average particle size of the crumbs is preferably 0.5 to 40 mm.

The methods of washing, dehydrating, and drying the crumbs may be made similar to the method of washing and dehydration and method of drying in the production of general rubber. As the washing and dehydrating method, a net-shaped filter, centrifugal separator, etc. may be used to separate the crumbs obtained by coagulation and water, then wash the crumbs and use a squeezer etc. to dehydrate the crumbs. Next, a band dryer, ventilation type standing dryer, single-screw extruder, twin-screw extruder, etc. which are used for production of general rubber may be used to dry the crumbs until a desired water content to thereby obtain a nitrile copolymer rubber composition of the present invention. Further, it is possible to use a twin-screw extruder to perform the coagulation and drying simultaneously.

Note that, as the method of preparation of the nitrile copolymer rubber composition of the present invention, in addition to the above-mentioned method, for example, it is possible to add to the latex of the nitrile copolymer rubber (A) all or part of all or at least one of the ingredients of the inorganic filler (B), acrylic resin and/or vinyl chloride resin which is added according to need, and plasticizer which is added according to need and coagulate and dry the mixture and knead the remains of the ingredients by a mixer such as rolls or a Bambury mixer.

Cross-Linkable Nitrile Copolymer Rubber Composition

The cross-linkable nitrile copolymer rubber composition of the present invention is comprised of the above-mentioned nitrile copolymer rubber composition of the present invention and a cross-linking agent.

The cross-linking agent is not particularly limited so long as one which is normally used as a cross-linking agent of a nitrile copolymer rubber. As a representative cross-linking agent, a sulfur-based cross-linking agent or organic peroxide cross-linking agent which cross-links unsaturated bonds of the nitrile copolymer rubber (A) and a polyamine cross-linking agent which cross-links carboxyl groups of the nitrile copolymer rubber (A) with each other may be mentioned. These may be used as single types alone or as a plurality of types combined. Among these as well, a sulfur-based cross-linking agent is preferable.

As the sulfur-based cross-linking agent, powdered sulfur, flowers of sulfur, precipitated sulfur, colloidal sulfur, surface-treated sulfur, insoluble sulfur, and other sulfur; sulfur chloride, sulfur dichloride, morpholin disulfide, alkylphenol disulfide, dibenzothiazyl disulfide, N,N'-dithio-bis(hexahydro-2H-azenopin-2), phosphorus-containing polysulfide, high molecular weight polysulfide, and other sulfur-containing compounds; tetramethylthiuram disulfide, selenium dimethyldithiocarbamate, 2-(4'-morpholinodithio)benzothiazole, and other sulfur-donor compounds; etc. may be mentioned. These may be used as single types alone or as a plurality of types combined.

As the organic peroxide cross-linking agent, dicumyl peroxide, cumen hydroperoxide, t-butylcumyl peroxide, p-menthane hydroperoxide, di-t-butylperoxide, 1,3-bis(t-butylperoxyisopropyl)benzene, 1,4-bis(t-butylperoxyisopropyl)benzene, 1,1-di-t-butylperoxy-3,3-trimethylcyclohexane, 4,4-bis-(t-butyl-peroxy)-n-butyl valerate, 2,5-dimethyl-2,5-di-t-butylperoxyhexane, 2,5-dimethyl-2,5-di-t-butylperoxyhexine-3, 1,1-di-t-butylperoxy-3,5,5-trimethylcyclohexane, p-chlorobenzoyl peroxide, t-butylperoxyisopropyl carbonate, t-butylperoxy benzoate, etc. may be mentioned. These may be used as single types alone or as a plurality of types combined.

The polyamine cross-linking agent is not particularly limited so long as a compound having two or more amino groups or one becoming the form of a compound having two or more amino groups at the time of cross-linking, but a compound of an aliphatic hydrocarbon or an aromatic hydrocarbon where a plurality of hydrogen atoms are substituted by amino groups or hydrazide structures (structures represented by —$CONHNH_2$, where CO represents a carbonyl group) is preferable.

As specific examples of the polyamine cross-linking agent, aliphatic polyvalent amines such as hexamethylene diamine, hexamethylenediamine carbamate, N,N-dicinnamylidene-1,6-hexanediamine, tetramethylenepentamine, and hexamethylenediamine cinnamaldehyde adduct; aromatic polyvalent amines such as 4,4-methylenedianiline, m-phenylenediamine, 4,4-diaminodiphenylether, 3,4-diaminodiphenylether, 4,4-(m-phenylenediisopropylidene)dianiline, 4,4-(p-phenylenediisopropylidene)dianiline, 2,2-bis[4-(4-aminophenoxy) phenyl]propane, 4,4-diaminobenzanilide, 4,4-bis(4-aminophenoxy)biphenyl, m-xylylenediamine, p-xylylenediamine, and 1,3,5-benzenetriamine; polyvalent hydrazides such as dihydrazide isophthalate, dihydrazide terephthalate, dihydrazide phthalate, dihydrazide 2,6-naphthalene dicarboxylate, naphthalenic acid dihydrazide ester, dihydrazide oxalate, dihydrazide malonate, dihydrazide succinate, dihydrazide glutamate, dihydrazide adipate, dihydrazide pimelate, dihydrazide suberate, dihydrazide azelate, dihydrazide sebacate, dihydrazide brassylate, dodecane diacid dihydrazide ester, dihydrazide acetone dicarboxylate, dihydrazide fumarate, dihydrazide malate, dihydrazide itaconate, dihydrazide trimellitate, dihydrazide 1,3,5-benzene tricarboxylate, dihydrazide aconitate, and dihydrazide pyromellitate; may be mentioned. Among these as well, aliphatic polyvalent amines and aromatic polyvalent amines are preferable, while hexamethylenediamine carbamate and 2,2-bis[4-(4-aminophenoxy)phenyl]propane are more preferable. Note that, the above polyamine cross-linking agents may be used as single types alone or as two types or more combined.

In the cross-linkable nitrile copolymer rubber composition of the present invention, the content of the cross-linking agent is not particularly limited, but is preferably 0.1 to 10 parts by weight with respect to 100 parts by weight of the nitrile copolymer rubber (A), more preferably 0.2 to 5 parts by weight.

When using an organic peroxide cross-linking agent, as the cross-linking aid, polyfunctional monomer such as trimethylolpropane trimethacrylate, divinylbenzene, ethylene dimethacrylate, and triallyl isocyanurate may be jointly used. The amount of use of these cross-linking aids is not particularly limited, but is preferably 0.5 to 20 parts by weight in range with respect to 100 parts by weight of the nitrile copolymer rubber (A).

When using a sulfur-based cross-linking agent, a cross-linking aid such as zinc white (zinc oxide), zinc peroxide, and stearic acid; a cross-linking accelerator such as a guanidine-based, aldehyde-amine-based, aldehyde-ammonia-based, thiazole-based, sulfenamide-based, and thiourea-based one may be jointly used. The amount of use of these cross-linking aids and cross-linking accelerators used is not particularly limited and is preferably 0.1 to 10 parts by weight in range with respect to 100 parts by weight of the nitrile copolymer rubber (A).

Note that, when using zinc peroxide as a cross-linking aid, compared with when using zinc white (zinc oxide), not only does the obtained cross-linked rubber become substantially equivalent in original state physical properties, gasoline permeation resistance, and cold resistance, but also the cross-linkable nitrile rubber composition is improved in scorch stability, so this is preferable.

When using a polyamine cross-linking agent, a basic cross-linking accelerator can be jointly used. As specific examples of the basic cross-linking accelerator, a basic cross-linking accelerator having a cyclic amidine structure such as 1,8-diazabicyclo[5,4,0]undecene-7 (below, sometimes abbreviated as "DBU"), 1,5-diazabicyclo[4,3,0]nonene-5 (below, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl) imidazole, 1-methylbenzoimidazole, 1-methyl-2-benzylbenzoimidazole, 1-methyl-5-nitrobenzoimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, and 1-ethoxymethyl-2-methylimidazoline; a guanidine-based basic cross-linking accelerator such as tetramethyl guanidine, tetraethyl guanidine, diphenyl guanidine, 1,3-di-o-tolyl guanidine, and o-tolylbiguanide; an aldehyde amine-based basic cross-linking accelerator such as n-butylaldehyde aniline and acetoaldehyde ammonia; etc. may be mentioned. Among these as well, a guanidine-based basic cross-linking accelerator and a basic cross-linking accelerator having a cyclic amidine structure is preferable, a basic cross-linking accelerator having a cyclic amidine structure is more preferable, 1,8-diazabicyclo[5,4,0]undecene-7 and 1,5-diazabicyclo[4,3,0]nonene-5 are further preferable, and 1,8-diazabicyclo[5,4,0]undecene-7 is particularly preferable. Note that, the above basic cross-linking accelerator having a cyclic amidine structure may form a salt with an organic carboxylic acid or alkyl phosphoric acid etc. The amount of use of these basic cross-linking accelerators is not particularly limited, but is preferably 0.1 to 20 parts by weight with respect to 100 parts by weight of the nitrile copolymer rubber (A), more preferably 0.2 to 15 parts by weight, still more preferably 0.5 to 10 parts by weight.

Further, the nitrile copolymer rubber composition or cross-linkable nitrile copolymer rubber composition of the present invention may contain, in accordance with need, compounding agents which are used in general rubber, for example, a cross-linking retardant, antiaging agent, filler other than the inorganic filler (B), slip agent, adhesive agent, lubricant, processing aid, flame retardant, anti-mold agent, antistatic agent, coloring agent, coupling agent, or other additive.

As the antiaging agent, an antiaging agent such as a phenol-based, amine-based, benzimidazole-based, and phosphoric acid-based one may be used. As the phenol-based one, 2,2'-methylenebis(4-methyl-6-t-butylphenol) etc., as the amine-based one, 4,4'-bis($\alpha,\alpha$-dimethylbenzyl) diphenylamine, N-isopropyl-N'-phenyl-p-phenylenediamine, etc., as the benzimidazole-based one, 2-mercaptobenzimidazole etc. may be mentioned. These are used as single types alone or as two or more types combined.

As fillers other than the inorganic filler (B), for example, carbon black, silica, calcium carbonate, aluminum silicate, magnesium silicate, calcium silicate, magnesium oxide, staple fibers, $\alpha,\beta$-ethylenically unsaturated carboxylic acid metal salts such as zinc (meth)acrylate and magnesium (meth)acrylate, etc. may be mentioned. These fillers may be treated by coupling treatment by a silane coupling agent, titanium coupling agent, etc. or treated by a surface modification agent by a higher fatty acid or its metal salt, ester or amide or other higher fatty acid derivative or surfactant etc.

Further, the nitrile copolymer rubber composition and cross-linkable nitrile copolymer rubber composition of the present invention may contain, to an extent not detracting from the effect of the present invention, a polymer other than the nitrile copolymer rubber (A). The polymer other than the nitrile copolymer rubber (A) is not particularly limited, but a fluororubber, styrene-butadiene copolymer rubber, ethylene-propylene copolymer rubber, ethylene-propylene-diene ternary copolymer rubber, natural rubber, polyisoprene rubber, epichlorohydrin rubber, urethane rubber, chloroprene rubber, ethylene-vinyl acetate copolymer, chlorosulfonated polyethylene, etc. may be mentioned. Note that, the amount when blending in a polymer other than the nitrile copolymer rubber (A) is preferably 100 parts by weight or less with respect to 100 parts by weight of the nitrile copolymer rubber (A), more preferably 50 parts by weight or less, particularly preferably 30 parts by weight or less.

The method of preparation of the cross-linkable nitrile copolymer rubber composition of the present invention is not particularly limited but the method of adding, to the above-mentioned nitrile copolymer rubber composition, a cross-linking agent, cross-linking aid, and other compounding agent and kneading the mixture by rolls, a Bambury mixer or other kneader etc. may be mentioned. Note that, the order of mixing in this case is not particularly limited, but it is sufficient to fully mix the ingredients which are resistant to reaction or breakdown by heat, then mix the ingredients which easily react or easily break down under heat, for example, the cross-linking agent, cross-linking accelerator, etc. at a temperature at which the reaction or breakdown does not occur and in a short time.

The cross-linkable nitrile copolymer rubber composition of the present invention has a Mooney viscosity ($ML_{1+4}$, 100° C.) of preferably 5 to 300, more preferably 10 to 250.

Cross-Linked Rubber

The cross-linked rubber of the present invention is obtained by cross-linking the above cross-linkable nitrile copolymer rubber composition.

When cross-linking the cross-linkable nitrile copolymer rubber composition of the present invention, a shaping machine corresponding to the shape of the shaped article (cross-linked rubber) being produced, for example, an extruder, injection molding machine, compressor, rolls, etc. is used to shape the composition, then a cross-linking reaction is caused to fix the shape of the cross-linked product. When performing the cross-linking, it is possible to cross-link the composition after the preliminary shaping or cross-link it simultaneously with the shaping. The shaping temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 1 hour.

Further, depending on its shape, size, etc., the cross-linked rubber will sometimes not be sufficiently cross-linked up to the inside even if its surface is cross-linked, so it is possible to further heat the product for secondary cross-linking.

The thus obtained cross-linked rubber of the present invention is obtained by using the above-mentioned nitrile copolymer rubber composition of the present invention, so is good in original state physical properties and excellent in gasoline permeation resistance and cold resistance. For this reason, the cross-linked rubber of the present invention is suitable for seal members such as a packing, gasket, O-ring, and oil seal; hoses such as an oil hose, fuel hose, inlet hose, gas hose, brake hose, and coolant hose; a diaphragm; accumulator bladder; boots; etc., but is particularly suitably used as a hose, seal, packing, or gasket.

Among these, the cross-linked rubber of the present invention is suitably used as a fuel hose etc. using a layer comprised of the cross-linked rubber of the present invention for at least one layer of a hose comprised of one layer or two layers or more. At this time, in the case of a two-layer or more laminate, the layer which is comprised of the cross-linked rubber of the present invention may be used for either the inside layer, intermediate layer, and outside layer. As the other layers of the laminate, nitrile rubber with a content of $\alpha,\beta$-ethylenically unsaturated nitrile monomer units of preferably 5 to 60 wt %, more preferably 18 to 50 wt % and also rubber which contains that nitrile rubber and a vinyl chloride resin or acrylic resin or a fluororubber, chloroprene rubber, hydrin rubber, chlorosulfonated polyethylene rubber, acrylic rubber, ethylene-acrylic acid copolymer, ethylene-propylene copolymer, ethylene-propylene-diene ternary copolymer, butyl rubber, isoprene rubber, natural rubber, styrene-butadiene copolymer, fluororesin, polyamide resin, polyvinyl alcohol, ethylene-vinyl acetate copolymer resin, ethylene-vinyl alcohol copolymer resin, polybutylene naphthalate, polyphenylene sulfide, polyolefin resin, polyester resin, etc. may be mentioned. These may be used as single types alone or as a plurality of types together.

Further, in accordance with need, to bond a layer which is comprised of the cross-linked rubber of the present invention and another layer, it is possible to include tetrabutylphosphonium benzotriazolate, tetraoctylphosphonium benzotriazolate, methyltrioctylphosphonium benzotriazolate, tetrabutylphosphonium tolyltriazolate, tetraoctylphosphonium tolyltriazolate, and other phosphonium salts, 1,8-diazabicyclo(5.4.0)undecene-7 salt (DBU salt), 1,5-diazabicyclo(4.3.0)-nonene-5 salt (DBN salt), etc. in one or both of the layer which is comprised of the cross-linked rubber of the present invention and another layer.

The method of production when making the cross-linked rubber of the present invention a hose having such a configuration is not particularly limited, but the method of using an extruder etc. to form a tubular shape and cross-linking this etc. may be mentioned.

EXAMPLES

Below, examples and comparative examples will be given to specifically explain the present invention, but the present invention is not limited to this. Below, unless otherwise indicated, the "parts" are based on weight. Note that, the physical properties and tests or methods of evaluation of the properties were as follows.

Mooney Viscosity

The Mooney viscosity of the nitrile copolymer rubber (polymer Mooney viscosity) ($ML_{1+4}$, 100° C.) was measured based on JIS K6300.

Original State Physical Properties (Tensile Strength, Elongation, 100% Tensile Stress, Hardness)

The cross-linkable nitrile rubber composition was placed in a mold of a vertical 15 cm, horizontal 15 cm, and depth 0.2 cm and press-formed at 160° C. for 20 minutes while applying 10 MPa pressure to obtain sheet-shaped cross-linked rubber. The obtained sheet-shaped cross-linked rubber was punched by a JIS No. 3 type dumbbell die to prepare test pieces, then these were used to measure the cross-linked rubber for tensile strength, elongation, and 100% tensile stress in accordance with JIS K6251. Further, in accordance with JIS K6253, a Durometer Hardness Tester Type A was used to measure the hardness of the cross-linked rubber.

Gasoline Permeation Coefficient

Sheet-shaped cross-linked rubber similar to the one used for evaluation of the above original state physical properties was prepared, "a mixture of isoctane, toluene, and ethanol in a weight ratio of 2:2:1" as fuel oil was used, and the aluminum cup method was employed to measure the gasoline permeation coefficient. Specifically, a 100 ml capacity aluminum cup was filled with the above fuel oil to 50 ml, the sheet-shaped cross-linked rubber was placed over it to cap it, then fasteners were used to adjust the area by which the sheet-shaped cross-linked rubber separated the inside and outside of the aluminum cup to 25.50 cm², the aluminum cup was allowed to stand in a 23° C. constant temperature tank, then the weight was measured every 24 hours to thereby measure the amount of permeation of the oil every 24 hours. The maximum amount was defined the amount of permeation (unit: g·mm/m²·day).

Note that, the lower the gasoline permeation coefficient, the better the gasoline permeation resistance can be evaluated and the more preferable.

Embrittlement Temperature

Sheet-shaped cross-linked rubber similar to the one used for evaluation of the above original state physical properties was used to measure the embrittlement temperature in accordance with JIS K6261.

Production Example 1 (Production of Latex of Nitrile Copolymer Rubber (A1))

To a reaction vessel, 240 parts of water, 75.7 parts of acrylonitrile, 2.1 parts of methacrylic acid, and 2.5 parts of sodium dodecylbenzene sulfonate (emulsifier) were charged. The temperature was adjusted to 5° C. Next, the gaseous phase was reduced in pressure and degassing sufficiently performed, then 22.2 parts of 1,3-butadiene, 0.06 part of a polymerization initiator constituted by p-menthane peroxide, 0.02 part of sodium ethylene diamine tetraacetate, 0.006 part of ferrous sulfate (7-hydrate), and 0.06 part of sodium formaldehyde sulfoxylate, and 1 part of a chain transfer agent constituted by t-dodecyl mercaptan were added to start the first stage reaction of the emulsion polymerization. After the start of the reaction, when the polymerization conversion rate with respect to the charged monomers reached 38 wt %, 57 wt %, and 71 wt %, the reaction vessel was respectively charged with 1,3-butadiene in 11 parts, 10 parts, and 9 parts for the second stage, third stage, and fourth stage polymerization reactions. After that, when the polymerization conversion rate for all of the charged monomers reached 80 wt %, 0.3 part of hydroxylamine sulfonate and 0.2 part potassium hydroxide were added to stop the polymerization reaction. After the reaction stopped, the content of the reaction vessel was warmed to 70° C. and steam distillation was used under reduced pressure to recover the unreacted monomers to obtain a latex of nitrile copolymer rubber (A1) (solid content: 24 wt %).

Next, part of the latex of nitrile copolymer rubber (A1) obtained above was sampled and made to coagulate by a large amount of methanol, then filtered and dried to obtain the nitrile copolymer rubber (A1). The ratios of content of the monomer units forming the nitrile copolymer rubber (A1) of the obtained latex were measured by $^1$H-NMR using an FT-NMR apparatus (product name "AVANCE III500", made by Bruker BioSpin), whereupon they were acrylonitrile units: 50 wt %, 1,3-butadiene units: 48 wt %, and methacrylic acid units: 2 wt %. Further, the Mooney viscosity of the nitrile copolymer rubber (A1) (polymer Mooney viscosity) was 75.

Production Example 2 (Production of Latex of Nitrile Copolymer Rubber (A2))

Except for changing, in Production Example 1, the monomers charged for the first stage reaction of the emulsion polymerization to 75.7 parts of acrylonitrile, 4.2 parts of methacrylic acid, and 20.1 parts of 1,3-butadiene, the same procedure was followed as in Production Example 1 to obtain a latex of nitrile copolymer rubber (A2) (solid content: 24 wt %).

The ratios of content of the monomer units forming the nitrile copolymer rubber (A2) of the obtained latex were measured in the same way as in Production Example 1 whereupon they were acrylonitrile units: 50 wt %, 1,3-butadiene units: 46 wt %, and methacrylic acid units: 4 wt %. Further, the Mooney viscosity of the nitrile copolymer rubber (A2) (polymer Mooney viscosity) was 73.

Production Example 3 ((Production of Latex of Nitrile Copolymer Rubber (A3))

Except for changing, in Production Example 1, the monomers charged for the first stage reaction of the emulsion polymerization to 75.7 parts of acrylonitrile, 4.2 parts of monobutyl maleate, and 20.1 parts of 1,3-butadiene, the same procedure was followed as in Production Example 1 to obtain a latex of nitrile copolymer rubber (A3) (solid content: 24 wt %).

The ratios of content of the monomer units forming the nitrile copolymer rubber (A3) of the obtained latex were measured in the same way as in Production Example 1 whereupon they were acrylonitrile units: 50 wt %, 1,3-butadiene units: 46 wt %, and monobutyl maleate units: 4 wt %. Further, the Mooney viscosity of the nitrile copolymer rubber (A3) (polymer Mooney viscosity) was 73.

Production Example 4 ((Production of Latex of Nitrile Copolymer Rubber (A4))

To a reaction vessel, 240 parts of water, 75.7 parts of acrylonitrile, and 2.5 parts of sodium dodecylbenzene sulfonate (emulsifier) were charged. The temperature was adjusted to 5° C. Next, the gaseous phase was reduced in pressure and degassing sufficiently performed, then 22 parts of 1,3-butadiene, 0.06 part of a polymerization initiator constituted by p-menthane peroxide, 0.02 part of sodium ethylene diamine tetraacetate, 0.006 part of ferrous sulfate (7-hydrate), 0.06 part of sodium formaldehyde sulfoxylate, and 1 part of a chain transfer agent constituted by t-dodecyl mercaptan were added to start the first stage reaction of the emulsion polymerization. After the start of the reaction, when the polymerization conversion rate with respect to the charged monomers reached 42 wt % and 60 wt %, the reaction vessel was respectively charged with 1,3-butadiene in 12 parts and 12 parts for the second and third stage polymerization reactions. After that, when the polymerization conversion rate for all of the charged monomers reached 75 wt %, 0.3 part of hydroxylamine sulfonate and 0.2 part of potassium hydroxide were added to stop the polymerization reaction. After the reaction stopped, the content of the reaction vessel was warmed to 70° C. and steam distillation was used under reduced pressure to recover the unreacted monomers to obtain a latex of nitrile copolymer rubber (A4) (solid content: 24 wt %).

The ratios of content of the monomer units forming the nitrile copolymer rubber (A4) of the obtained latex were measured in the same way as in Production Example 1 whereupon they were acrylonitrile units: 50 wt % and 1,3-butadiene units: 50 wt %. Further, the Mooney viscosity of the nitrile copolymer rubber (A4) (polymer Mooney viscosity) was 75.

Production Example 5 (Production of Latex of Nitrile Copolymer Rubber (A5))

Except for changing, in Production Example 1, the monomers charged for the first stage reaction of the emulsion polymerization to 75.7 parts of acrylonitrile, 2.2 parts of 2-vinylpyridine, and 22 parts of 1,3-butadiene, the same procedure was followed as in Production Example 1 to obtain a latex of nitrile copolymer rubber (A5) (solid content 24 wt %).

The ratios of content of the monomer units forming the nitrile copolymer rubber (A5) of the obtained latex were measured in the same way as in Production Example 1 whereupon they were acrylonitrile units: 50 wt %, 1,3-butadiene units: 48 wt %, and 2-vinylpyridine units: 2 wt %. Further, the Mooney viscosity of the nitrile copolymer rubber (A5) (polymer Mooney viscosity) was 73.

Production Example 6 (Production of Latex of Nitrile Copolymer Rubber (A6))

Except for changing, in Production Example 1, the monomers charged for the first stage reaction of the emulsion polymerization to 75.7 parts of acrylonitrile, 0.2 part of methacrylic acid, and 24.1 parts of 1,3-butadiene, the same procedure was followed as in Production Example 1 to obtain a latex of nitrile copolymer rubber (A6) (solid content: 24 wt %).

The ratios of content of the monomer units forming the nitrile copolymer rubber (A6) of the obtained latex were measured in the same way as in Production Example 1 whereupon they were acrylonitrile units: 50 wt %, 1,3-butadiene units: 49.9 wt %, and methacrylic acid units: 0.1 wt %. Further, the Mooney viscosity of the nitrile copolymer rubber (A6) (polymer Mooney viscosity) was 73.

Production Example 7 (Production of Latex of Nitrile Copolymer Rubber (A7))

Except for changing, in Production Example 1, the monomers charged for the first stage reaction of the emulsion polymerization to 23.2 parts of acrylonitrile, 4.4 parts of methacrylic acid, and 72.4 parts of 1,3-butadiene, further adding 4 parts of acrylonitrile and 2.8 parts of acrylonitrile to the reaction vessel when the polymerization conversion rates reached 38 wt % and 60 wt % for second stage and third stage polymerization reactions, and making the polymerization reaction stop when the polymerization conversion rate reached 75 wt %, the same procedure was followed as in Production Example 1 to obtain a latex of nitrile copolymer rubber (A7) (solid content: 24 wt %).

The ratios of content of the monomer units forming the nitrile copolymer rubber (A7) of the obtained latex were measured in the same way as in Production Example 1 whereupon they were acrylonitrile units: 30 wt %, 1,3-butadiene units: 66 wt %, and methacrylic acid units: 4 wt %. Further, the Mooney viscosity of the nitrile copolymer rubber (A7) (polymer Mooney viscosity) was 73.

Production Example 8 (Production of Latex of Hydrogenated Nitrile Copolymer Rubber (A8))

To the latex of the nitrile copolymer rubber (A1) obtained in Production Example 1, a palladium catalyst (solution of 1 wt % palladium acetate acetone solution and equal weight of ion exchanged water mixed together) was added to the reactor to give a palladium content of 1000 ppm with respect to the dry weight of the rubber contained in the latex. The mixture was reacted at a hydrogen pressure of 3 MPa and temperature 50° C. for 6 hours for hydrogenation to obtain a latex of hydrogenated nitrile copolymer rubber (A8).

The ratios of content of the monomer units forming the obtained hydrogenated nitrile copolymer rubber (A8) were measured in the same way as in Production Example 1, whereupon they were acrylonitrile monomer units: 50 wt %, total of 1,3-butadiene units and saturated butadiene units: 48 wt %, and methacrylic acid units: 2 wt %. Further, the Mooney viscosity of the hydrogenated nitrile copolymer rubber (A8) (polymer Mooney viscosity) was 167, while the iodine value was 28.

Production Example 9 (Production of Latex of Hydrogenated Nitrile Copolymer Rubber (A9))

To the latex of the nitrile copolymer rubber (A4) obtained in Production Example 4, a palladium catalyst (solution of 1 wt % palladium acetate acetone solution and equal weight of ion exchanged water mixed together) was added to give a palladium content of 1000 ppm with respect to the dry weight of the rubber contained in the latex. The mixture was reacted at a hydrogen pressure of 3 MPa and temperature 50° C. for 6 hours for hydrogenation to obtain a latex of hydrogenated nitrile copolymer rubber (A9).

The ratios of content of the monomer units forming the obtained hydrogenated nitrile copolymer rubber (A9) were measured in the same way as in Production Example 1, whereupon they were acrylonitrile monomer units: 50 wt % and a total of 1,3-butadiene units and saturated butadiene units: 50 wt %. Further, the Mooney viscosity of the hydrogenated nitrile copolymer rubber (A9) (polymer Mooney viscosity) was 155, while the iodine value was 20.

Production Example 10 (Production of Latex of Vinyl Chloride Resin)

A pressure resistant reaction vessel was charged with 120 parts of water, 0.8 part of sodium lauryl sulfate, and 0.06 part of potassium persulfate, reduced in pressure to be degassed repeatedly two times, then charged with 100 parts of vinyl chloride. The mixture was stirred while being warmed and polymerized at 47° C. by emulsion polymerization. When the polymerization conversion rate reached 90%, the mixture was cooled to room temperature and the unreacted monomers were removed. The concentration of the obtained vinyl chloride resin latex was 41 wt %. The average particle size of the vinyl chloride resin was 0.3 μm, while the average polymerization degree according to JIS K6721 was 1,300 and the glass transition temperature was 80° C.

Example 1

Preparation of Latex Composition of Nitrile Copolymer Rubber 100 parts of an inorganic filler (B) constituted by refined bentonite (product name "BEN-GEL HV", made by Hojun, aspect ratio: 295, flat-shaped refined bentonite) was added into 1995 parts of distilled water in the presence of 5 parts of sodium polyacrylate and the mixture strongly stirred to obtain an aqueous dispersion of the inorganic filler (B) of a solid content concentration 5%.

Further, the latex of the nitrile copolymer rubber (A1) obtained in Production Example 1 was stirred in the container while adding and dispersing the above prepared aqueous dispersion of the inorganic filler (B). Note that, the aqueous dispersion of the inorganic filler (B) was added to give 20 parts of inorganic filler (B) with respect to 100 parts of the solid content of the latex of the nitrile copolymer rubber (A1) (amount of nitrile copolymer rubber). Next, the obtained nitrile copolymer latex composition was coagulated by pouring it, under stirring, into an aqueous solution which contains an amount of sodium chloride (coagulating agent) of 130 wt % with respect to the amount of the nitrile copolymer rubber (A1) in the latex composition while adjusting the pH by timely adding 10% dilute sulfuric acid to give a pH of the aqueous solution during coagulation of 2, to thereby prepare crumbs comprised of a mixture of nitrile copolymer rubber (A1) and inorganic filler (B).

Preparation of Cross-Linkable Nitrile Copolymer Rubber Composition

Further, the obtained crumbs were separated by filtration, rinsed, then dried in vacuo at 60° C. Next, a Bambury mixer was used to add, to the above dried crumbs, 10 parts of MT carbon black ("Thermax Medium Thermal Carbon Black N990", made by CANCARB) and 1 part of a cross-linking aid constituted by stearic acid, with respect to 100 parts of the nitrile copolymer rubber (A1) in the crumbs. These were mixed at 50° C. Further, this mixture was transferred to rolls where 0.5 part of a cross-linking agent constituted by 325 mesh sulfur, 2.5 parts of tetramethylthiuram disulfide (product name "Noccelar TT", made by Ouchi Shinko Chemical Industrial), 1.5 parts of N-cyclohexyl-2-benzothiazolyl sulfenamide (product name "Noccelar CZ", made by Ouchi Shinko Chemical Industrial, cross-linking accelerator), and 5 parts of zinc peroxide (made by HakusuiTech, cross-linking aid) were added. The mixture was kneaded at 50° C. to prepare a cross-linkable nitrile copolymer rubber composition.

The cross-linked rubber obtained by cross-linking the above-obtained cross-linkable nitrile copolymer rubber composition was evaluated for original state physical properties (tensile strength, elongation, 100% tensile stress, hardness), gasoline permeation coefficient, and embrittlement temperature in accordance with the above methods. The results are shown in Table 1.

Examples 2 and 3

Except for respectively using, instead of the latex of the nitrile copolymer rubber (A1), the latex of the nitrile copolymer rubber (A2) obtained in Production Example 2 (Example 2) and the latex of the nitrile copolymer rubber (A3) obtained in Production Example 3 (Example 3), the same procedure was followed as in Examples 1 to prepare cross-linkable nitrile rubber compositions and the same procedure was followed to evaluate them. The results are shown in Table 1.

Example 4

When preparing the latex composition of a nitrile copolymer rubber, except for further adding the latex of the vinyl chloride resin obtained in Production Example 10 in an amount giving an amount of vinyl chloride resin of 65 parts with respect to 100 parts of the nitrile copolymer rubber (A1), the same procedure was followed as in Example 1 to obtain a latex composition of a nitrile copolymer rubber. Next, the thus obtained latex composition of a nitrile copolymer rubber was treated to coagulate by the same procedure as in Example 1 to thereby form crumbs comprised of a mixture of the nitrile copolymer rubber (A1), inorganic filler (B), and vinyl chloride resin.

Further, the obtained crumbs were separated by filtration, rinsed, then dried in vacuo at 60° C. Next, a Bambury mixer was used to add 2 parts of a stabilizer (product name: "Alcamizer-1", made by Kyowa Chemical) to the above dried crumbs, and mix the mixture until a temperature of 180° C. Next, this mixture was transferred to rolls and cooled, then the Bambury mixer was again used to add, with respect to 100 parts of the nitrile copolymer rubber (A1), 45 parts of a plasticizer constituted by di(butoxyethoxyethyl) adipate, 35 parts of MT carbon black ("Thermax Medium Thermal Carbon Black N990", made by CANCARB), and 1.5 parts of a cross-linking aid constituted by stearic acid. These were mixed at 50° C. Further, this mixture was transferred to rolls where 0.8 part of a cross-linking agent constituted by 325 mesh sulfur, 2.5 parts of tetramethylthiuram disulfide (product name "Noccelar TT", made by Ouchi Shinko Chemical Industrial), 2.5 parts of N-cyclohexyl-2-benzothiazolyl sulfenamide (product name "Noccelar CZ", made by Ouchi Shinko Chemical Industrial, cross-linking accelerator), and 7 parts of zinc peroxide (made by HakusuiTech, cross-linking aid) were added. The mixture was kneaded at 50° C. to prepare a cross-linkable nitrile copolymer rubber composition.

Further, the obtained cross-linkable nitrile rubber composition was evaluated in the same way as Example 1. The results are shown in Table 1.

Example 5

Except for using, instead of a latex of the nitrile copolymer rubber (A1), a latex of the nitrile copolymer rubber (A2) obtained in Production Example 2, the same procedure was followed as in Example 4 to prepare a cross-linkable nitrile rubber composition and the same procedure was followed to evaluate it. The results are shown in Table 1.

Comparative Examples 1 to 4

Except for using, instead of a latex of the nitrile copolymer rubber (A1), respectively, a latex of the nitrile copolymer rubber (A4) obtained in Production Example 4 (Comparative Example 1), a latex of the nitrile copolymer rubber (A5) obtained in Production Example 5 (Comparative Example 2), a latex of the nitrile copolymer rubber (A6) obtained in Production Example 6 (Comparative Example 3), and a latex of the nitrile copolymer rubber (A7) obtained in Production Example 7 (Comparative Example 4) and for using, instead of zinc peroxide, zinc oxide, the same procedure was followed as in Example 1 to prepare cross-linkable nitrile rubber compositions and the same procedure was followed to evaluate them. The results are shown in Table 1.

Comparative Example 5

Except for not including an inorganic filler (B) constituted by refined bentonite, the same procedure was followed as in Example 1 to prepare a cross-linkable nitrile rubber composition and the same procedure was followed to evaluate it. The results are shown in Table 1.

Example 6

Except for using, instead of a latex of the nitrile copolymer rubber (A1), a latex of the nitrile copolymer rubber (A8) obtained in Production Example 8, the same procedure was followed as in Example 1 to prepare a cross-linkable nitrile rubber composition and the same procedure was followed to evaluate it. The results are shown in Table 2.

Comparative Example 6

Except for using, instead of a latex of the nitrile copolymer rubber (A1), a latex of the nitrile copolymer rubber (A9) obtained in Production Example 9 and using, instead of zinc peroxide, zinc oxide, the same procedure was followed as in Example 1 to prepare a cross-linkable nitrile rubber composition and the same procedure was followed to evaluate it. The results are shown in Table 2.

TABLE 1

| | | | Example | | | | | Comparative Example | | | | |
|---|---|---|---|---|---|---|---|---|---|---|---|---|
| | | | 1 | 2 | 3 | 4 | 5 | 1 | 2 | 3 | 4 | 5 |
| Nitrile copolymer rubber | | | | | | | | | | | | |
| Composition | Acrylonitrile units | (wt %) | 50 | 50 | 50 | 50 | 50 | 50 | 50 | 50 | 30 | 50 |
| | 1,3-butadiene units | (wt %) | 48 | 46 | 46 | 48 | 46 | 50 | 48 | 49.9 | 66 | 46 |
| | Methacrylic acid units | (wt %) | 2 | 4 | — | 2 | 4 | — | — | 0.1 | 4 | 4 |
| | Monobutyl maleate units | (wt %) | — | — | 4 | — | — | — | — | — | — | — |
| | 2-vinylpyridine units | (wt %) | — | — | — | — | — | — | 2 | — | — | — |
| Formulation of cross-linkable nitrile copolymer rubber composition | | | | | | | | | | | | |
| Nitrile copolymer rubber | | (parts) | 100 | 100 | 100 | 100 | 100 | 100 | 100 | 100 | 100 | 100 |
| Refined bentonite | | (parts) | 20 | 20 | 20 | 20 | 20 | 20 | 20 | 20 | 20 | — |
| MT carbon black | | (parts) | 10 | 10 | 10 | 35 | 35 | 10 | 10 | 10 | 10 | 10 |
| Zinc peroxide | | (parts) | 5 | 5 | 5 | 7 | 7 | — | — | — | — | 5 |
| Zinc oxide | | (parts) | — | — | — | — | — | 5 | 5 | 5 | 5 | — |
| Stearic acid | | (parts) | 1 | 1 | 1 | 1.5 | 1.5 | 1 | 1 | 1 | 1 | 1 |
| Sulfur | | (parts) | 0.5 | 0.5 | 0.5 | 0.8 | 0.8 | 0.5 | 0.5 | 0.5 | 0.5 | 0.5 |
| Tetramethylthiuram disulfide | | (parts) | 2.5 | 2.5 | 2.5 | 2.5 | 2.5 | 2.5 | 2.5 | 2.5 | 2.5 | 2.5 |
| N-cyclohexyl-2-benzothiazolyl sulfenamide | | (parts) | 1.5 | 1.5 | 1.5 | 2.5 | 2.5 | 1.5 | 1.5 | 1.5 | 1.5 | 1.5 |
| Vinyl chloride resin | | (parts) | — | — | — | 65 | 65 | — | — | — | — | — |
| Di(butoxyethoxyethyl)adipate | | (parts) | — | — | — | 45 | 45 | — | — | — | — | — |
| Tensile strength | | (MPa) | 19.2 | 21.6 | 21.8 | 20.4 | 22.7 | 19.4 | 18.2 | 19.8 | 18.8 | 10.1 |
| Elongation | | (%) | 290 | 270 | 260 | 360 | 330 | 400 | 350 | 380 | 310 | 520 |
| 100% tensile stress | | (MPa) | 9.1 | 13.4 | 13.6 | 8.2 | 12.3 | 5.8 | 7.8 | 6.1 | 5.2 | 0.8 |
| Hardness | | (Duro-A) | 83 | 88 | 89 | 75 | 80 | 77 | 79 | 78 | 78 | 54 |
| Gasoline permeation coefficient | | [g × mm/ m² × day] | 270 | 255 | 260 | 212 | 206 | 332 | 286 | 333 | 560 | 553 |
| Embrittlement temperature | | (° C.) | −22 | −20 | −21 | −27 | −24 | −15 | −12 | −15 | −33 | −20 |

TABLE 2

| | | | Example 6 | Comparative Example 6 |
|---|---|---|---|---|
| Hydrogenated nitrile copolymer rubber | | | | |
| Composition | Acrylonitrile units | (wt %) | 50 | 50 |
| | 1,3-butadiene units and saturated butadiene ur | (wt %) | 48 | 50 |
| | Methacrylic acid units | (wt %) | 2 | — |
| | Monobutyl maleate units | (wt %) | — | — |
| | 2-vinylpyridine units | (wt %) | — | — |
| | Iodine value | | 28 | 20 |

TABLE 2-continued

| | | Example 6 | Comparative Example 6 |
|---|---|---|---|
| Formulation of cross-linkable nitrile copolymer rubber composition | | | |
| Hydrogenated nitrile copolymer rubber | (parts) | 100 | 100 |
| Refined bentonite | (parts) | 20 | 20 |
| MT carbon black | (parts) | 10 | 10 |
| Zinc peroxide | (parts) | 5 | — |
| Zinc oxide | (parts) | — | 5 |
| Stearic acid | (parts) | 1 | 1 |
| Sulfur | (parts) | 0.5 | 0.5 |
| Tetramethylthiuram disulfide | (parts) | 2.5 | 2.5 |
| N-cyclohexyl-2-benzothiazolyl sulfenamide | (parts) | 1.5 | 1.5 |
| Vinyl chloride resin | (parts) | — | — |
| Di(butoxyethoxyethyl)adipate | (parts) | — | — |
| Tensile strength | (MPa) | 23.9 | 27.5 |
| Elongation | (%) | 400 | 510 |
| 100% tensile stress | (MPa) | 13.7 | 7.2 |
| Hardness | (Duro-A) | 89 | 77 |
| Gasoline permeation coefficient | (g × mm/m$^2$ × day) | 258 | 353 |
| Embrittlement temperature | (° C.) | −30 | −26 |

From Tables 1 and 2, by cross-linking a nitrile copolymer rubber composition (including "hydrogenated nitrile copolymer rubber composition") comprised of a (hydrogenated) nitrile copolymer rubber (A) containing 35 to 80 wt % of α,β-ethylenically unsaturated nitrile monomer units, 19.5 to 64.5 wt % of conjugated diene monomer units, and 0.5 to 20 wt % of α,β-ethylenically unsaturated carboxylic acid monomer units in which an inorganic filler (B) with an aspect ratio of 30 to 2,000 is included in a predetermined ratio, the result was that the obtained cross-linked rubber was good in original state physical properties (mechanical properties) and excellent in gasoline permeation resistance and cold resistance (Examples 1 to 6).

On the other hand, when using, as a nitrile copolymer rubber, one not containing α,β-ethylenically unsaturated carboxylic acid monomer units or when using one with a ratio of content of α,β-ethylenically unsaturated carboxylic acid monomer units of less than 0.5 wt %, the result was that the obtained cross-linked rubber was inferior in cold resistance (Comparative Examples 1 to 3).

When using, as a nitrile copolymer rubber, one having a ratio of content of α,β-ethylenically unsaturated nitrile monomer units and a ratio of content of conjugated diene monomer units outside the predetermined ranges of the present invention, the result was that the obtained cross-linked rubber was inferior in gasoline permeation resistance (Comparative Example 4).

Further, when not blending in the inorganic filler (B), the result was that the obtained cross-linked rubber was inferior in gasoline permeation resistance (Comparative Example 5).

Furthermore, when using, as a hydrogenated nitrile copolymer rubber, one not containing α,β-ethylenically unsaturated carboxylic acid monomer units, the result was the gasoline permeation resistance was inferior (Comparative Example 6).

The invention claimed is:

1. A nitrile copolymer rubber composition comprising:
(A) a nitrile copolymer rubber containing:
   (a1) 40 to 70 wt % of α,β-ethylenically unsaturated nitrile monomer units;
   (a2) 29.5 to 59.5 wt % of conjugated diene monomer units; and
   (a3) 0.5 to 20 wt % of α,β-ethylenically unsaturated carboxylic acid monomer units; and
(B) an inorganic filler with an aspect ratio of 30 to 2,000, wherein a content of the (B) inorganic filler with respect to 100 parts by weight of the (A) nitrile copolymer rubber is 1 to 200 parts by weight.

2. The nitrile copolymer rubber composition according to claim 1, wherein the (A) nitrile copolymer rubber contains the (a1) α,β-ethylenically unsaturated nitrile monomer units in an amount of from 50 to 60 wt %.

3. The nitrile copolymer rubber composition according to claim 1, wherein the (A) nitrile copolymer rubber contains the (a2) conjugated diene monomer units in an amount of from 39 to 48 wt %.

4. The nitrile copolymer rubber composition according to claim 1, wherein the (B) inorganic filler is a flat-shaped inorganic filler.

5. The nitrile copolymer rubber composition according to claim 1, wherein the (a3) α,β-ethylenically unsaturated carboxylic acid monomer units are α,β-ethylenically unsaturated monocarboxylic acid monomer units having 3 to 8 carbon atoms and/or butenedioic acid mono chain alkyl ester monomer units having 5 to 15 carbon atoms.

6. The nitrile copolymer rubber composition according to claim 1, wherein the (A) nitrile copolymer rubber is a hydrogenated nitrile copolymer rubber where at least part of the carbon-carbon unsaturated bond parts is hydrogenated.

7. The nitrile copolymer rubber composition according to claim 1, further comprising 10 to 150 parts by weight of a vinyl chloride resin and/or acrylic resin with respect to 100 parts by weight of the (A) nitrile copolymer rubber.

8. A cross-linkable nitrile copolymer rubber composition comprising the nitrile copolymer rubber composition according to claim 1 and a cross-linking agent.

9. A cross-linked rubber obtained by cross-linking the cross-linkable nitrile copolymer rubber composition according to claim 8.

10. An article selected from the group consisting of a hose, a seal, a packing, and a gasket, which comprises the cross-linked rubber according to claim 9.

11. A laminate comprised of two or more layers, at least one layer of which is comprised of the cross-linked rubber according to claim 9.

12. The cross-linkable nitrile copolymer rubber composition according to claim 8, wherein the cross-linking agent is a sulfur-based cross-linking agent.

13. A cross-linked rubber obtained by cross-linking the cross-linkable nitrile copolymer rubber composition according to claim 12.

14. An article selected from the group consisting of a hose, a seal, a packing, and a gasket, which comprises the cross-linked rubber according to claim 13.

15. A laminate comprised of two or more layers, at least one layer of which is comprised of the cross-linked rubber according to claim 13.

* * * * *